United States Patent [19]
Lee et al.

[11] Patent Number: 5,391,404
[45] Date of Patent: Feb. 21, 1995

[54] PLASMA SPRAYED MULLITE COATINGS ON SILICON-BASE CERAMICS

[75] Inventors: Kang N. Lee, Westlake; Robert A. Miller, Brecksville; Nathan S. Jacobson, Bay Village, all of Ohio

[73] Assignee: The United States of America as represented by the National Aeronautics and Space Administration, Washington, D.C.

[21] Appl. No.: 31,444

[22] Filed: Mar. 15, 1993

[51] Int. Cl.$^6$ .............................................. B05D 1/08
[52] U.S. Cl. ................................. 427/452; 427/453; 427/309
[58] Field of Search ................ 427/446, 452, 453, 309

[56] References Cited

U.S. PATENT DOCUMENTS

| | | | |
|---|---|---|---|
| 3,617,358 | 11/1971 | Dittrich | 117/105.2 |
| 4,039,480 | 8/1977 | Watson et al. | 252/455 R |
| 4,460,654 | 7/1984 | Interrante | 428/428 |
| 4,528,038 | 7/1985 | Williams | 106/287.13 |
| 4,554,186 | 11/1985 | Williams | 427/387 |
| 4,921,721 | 5/1990 | Matsui et al. | 427/309 |
| 4,963,436 | 10/1990 | Jones et al. | 428/403 |

FOREIGN PATENT DOCUMENTS

| | | | |
|---|---|---|---|
| 946230 | 4/1974 | Canada | 427/452 |
| 3538390 | 4/1987 | Germany | 427/452 |
| 18840 | of 1914 | United Kingdom | 427/446 |

OTHER PUBLICATIONS

Metco Research–Development Powders, pp. 1–3 Jul. 1963.

*Primary Examiner*—Shrive Beck
*Assistant Examiner*—Katherine A. Bareford
*Attorney, Agent, or Firm*—Gene E. Shook; Guy M. Miller

[57] ABSTRACT

A silicon-base ceramic substrate is provided with a mullite coating by flame-spraying heated crystalline mullite powders onto a substrate that is preheated to a temperature in excess of 800° C. The mullite immediately crystallizes as it solidifies.

7 Claims, 1 Drawing Sheet

PLASMA SPRAYED MULLITE COATINGS ON SILICON-BASE CERAMICS

ORIGIN OF THE INVENTION

The invention described herein was made by employees of the U.S. Government together with an associate of the National Research Council and is subject to the provisions of Section 305 of the National Aeronautics & Space Act of 1958, Public Law 85–568 (72 Stat. 435, 42 USC 2457).

TECHNICAL FIELD

This invention is concerned with plasma sprayed coatings on ceramic materials. The invention is particularly directed to plasma sprayed mullite coatings on silicon-base ceramics.

Silicon-base ceramics have been proposed for high temperature structural applications, such as heat exchangers, gas turbines, and advanced internal combustion engines. Silicon-base composites have been proposed as materials for applications in combustors for next generation supersonic commercial airplanes. Because these materials exhibit poor oxidation resistance in reducing atmospheres and in environments containing salts, water vapor or hydrogen, it is necessary to apply chemical barrier coatings (CBCs) which provide protection from chemical/environmental attack at elevated temperatures. The suggested application of these materials in aircraft engines also necessitates the development of thermal barrier coatings (TBCs) which are generally used to extend the life of components exposed at high elevated temperatures.

Mullite has been proposed as a material for chemical barrier coatings as well as thermal barrier coatings on silicon-base ceramics. Mullite exhibits excellent environmental durability, low thermal conductivity and low coefficients of thermal expansion comparable to silicon-base ceramic materials.

In the prior art attempts were made to apply mullite coatings on silicon-base ceramic materials because of their high potential as high temperature structural materials. However, mullite coatings applied by traditional plasma spray processes crack extensively and debond on thermal cycling.

It has been found that mullite coatings applied by traditional plasma spray processes contain a large amount of amorphous mullite. This formation of amorphous mullite is due to the rapid solidification of plasma sprayed molten mullite on cold substrates. The amorphous mullite then crystallizes at about 1000° C. during thermal cycling. The shrinkage of the mullite coating during the crystallization of amorphous mullite is the key factor causing the observed cracking and debonding on thermal cycling. To be utilized as chemical barrier coatings or thermal barrier coatings, it is essential that mullite coatings adhere to the substrate. It is further critical that these materials do not crack on thermal cycling. Because of the extensive cracking and debonding, chemical/environmental protection and thermal barrier effects rendered by mullite coatings prepared by traditional plasma processes have been minimal.

It is, therefore, an object of the present invention to provide adherent and durable plasma sprayed mullite coatings on silicon-base ceramics.

A further object of the invention is to provide mullite coatings that adhere to a silicon-base ceramic substrate and do not crack on thermal cycling.

BACKGROUND ART

Dittrich U.S. Pat. No. 3,617,358 relates to the composition of mullite powders used in flame spray coating of metals and ceramics. Watson et al U.S. Pat. No. 4,039,480 describes mullite coated spherical balls used in high temperature automotive applications, such as catalytic converters. Heating is disclosed for the purpose of sintering after the application of the coating.

Jones et al U.S. Pat. No. 4,963,436 is directed to the production of mullite hollow spheres used as catalysts or in packing columns. Here again, heating is utilized for sintering after the application of the coating.

Interrante U.S. Pat. No. 4,060,654 is concerned with a method of applying aluminosilicate coatings, such as mullite, which permits the use of known high temperature oxides as coating materials. Heating is relied on after the application of the amorphous mullite.

Williams U.S. Pat. No. 4,528,038 is concerned with the use of mullite coatings in which the coating is heated and components dipped into a bath for coating the substrate. Heating follows the coating process. Williams U.S. Pat. No. 4,554,186 relates to heating the substrate material after the application of the mullite coating.

DISCLOSURE OF THE INVENTION

According to the present invention mullite coatings are plasma sprayed onto silicon-base ceramic materials. More particularly, a crystalline mullite powder is heated and flame-sprayed onto a preheated substrate.

The substrate is heated to a temperature in excess of 800° C. during the spraying process. At such temperatures mullite will immediately crystallize as it solidifies.

Such high temperatures insure a slow solidification process. This slow solidification facilitates the formation of a crystalline mullite coating which is more immune to cracking and delamination as the coated material cools to ambient temperature.

BRIEF DESCRIPTION OF THE DRAWINGS

The objects, advantages, and novel features of the invention will be more fully apparent from the following detailed description when read in connection with the accompanying drawings wherein.

BEST MODE FOR CARRYING OUT THE INVENTION

Shrinkage of the coating with the resultant cracking and debonding is eliminated with a mullite coating that has been applied in accordance with the present invention. This is accomplished by preventing the deposition of amorphous mullite by heating the substrate to a very high temperature during the spraying process. The substrate is heated to a temperature greater than about 800° C. during spraying. In the preferred embodiment, the substrate is heated to a temperature greater than about 1000° C. which is the crystallization temperature of amorphous mullite. It is further contemplated that the substrate be heated to a temperature greater than about 1200° C.

The beneficial technical effects of the present invention are illustrated by silicon carbide substrates coated in accordance with the present invention. The silicon carbide substrates were 2.54 centimeters by 0.45 centimeters by 0.2 centimeters coupons. The coupons are a commercially available alloy, known as hexoloy, which is a registered trademark of the Carborundum Company of Niagara Falls, N.Y.

These coupons were etched in molten sodium carbonate. The etching was performed by heating to about 860° C. to 1000° C. for about 8–10 hours to produce a rough surface on each coupon.

The etched coupons were then oxidized at 1000° C. in air for about 28 to about 30 minutes to burn out residual carbon on the etched surface. The coupons were subsequently immersed in 10% HF for 24 hours to dissolve silica.

The spray powder was mullite which was purchased from a commercial vendor with a powder size of −62/+20 μm. The coating parameters were:

| | |
|---|---|
| Plasma gun power | 36–53 kw |
| Plasma arc gas | Ar-40% He |
| Ar powder carrier gas flow rate | 2–6 SLPM |

The substrate was placed inside a furnace while the temperature was monitored with a thermocouple. Mullite powder was fed when a predetermined temperature listed above was reached.

Figure 1:
FIG. 1 is a photomicrograph at a 200 magnification showing a mullite coating that has been plasma sprayed onto a silicon carbide substrate after it has been heated to about 1050° C.

Post test metallographic examination of the coatings applied at substrate temperatures of about 800° C. and about 1300° C. reveal the coatings were well bonded to the substrate. As shown in FIG. 1, no cracks were observed.

Figure 2:
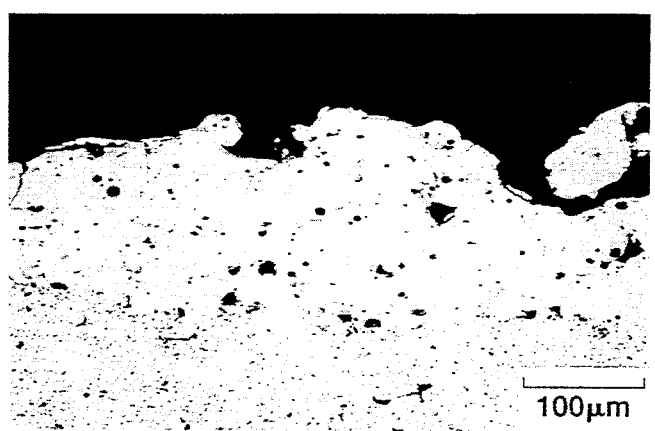
FIG. 2 is a photomicrograph at a 200 magnification of the coating shown in FIG. I after completing two 24-hour thermal cycles at 1000° C.
Figure 3:
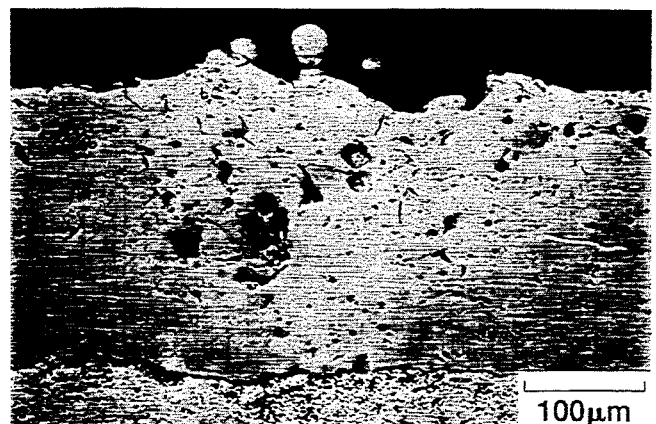
FIG. 3 is a photomicrograph at a 200 magnification of a mullite coating that has been plasma sprayed onto a silicon carbide substrate after it has been heated to about 1250° C. and after completing ten 20-hour thermal cycles at 1400° C.

The coatings were thermally cycled between room temperature and up to about 1400° C. For each cycle, the coupon was inserted to a preheated furnace in air, held in the furnace for about 20 to 24 hours, and air quenched to room temperature. Metallographic examination of the thermally-cycled coatings revealed that the coatings were still well bonded and only a few microcracks were observed as illustrated in FIGS. 2 and 3. The observed microcracks were not interconnected. Thus, these microcracks would not act as paths for oxidants.

It is apparent from FIGS. 1, 2, and 3 as well as the above explanation, that the coating process can be used to prepare adherent and durable mullite coatings on silicon-base ceramic material. These may be chemical barrier coatings or thermal barrier coatings. Because of the excellent adherence and coherence, chemical/environmental protection and thermal barrier effects rendered by the mullite coatings prepared by this process are superior to mullite coatings prepared by traditional plasma spray processes.

The extensive cracking and debonding of conventionally prepared mullite coatings which contain a large amount of amorphous mullite have been eliminated. This results from the mostly crystalline mullite coatings obtained by heating the substrate to a very high temperature which is greater than about 800° C., preferably greater than about 1000° C., and optimally greater than about 1200° C. during the coating process.

While the preferred embodiment of the invention has been disclosed and described, it will be appreciated that the various procedural modifications may be made to the process without departing from the spirit thereof or the scope of the subjoined claims. By way of example, it is contemplated that other silicon-base ceramics, such as $Si_3N_4$ or composites based on SiC or $Si_3N_4$, or other ceramics, metals, or metal alloys may be used for the substrate. The plasma spray parameters, substrate temperature, and substrate shape may be modified from those described above. Also, the substrate may be heated by other methods, such as a heating lamp or resistance heating.

What is claimed:

1. A method of applying a chemical and thermal barrier coating to a surface of a silicon-base ceramic substrate comprising the steps of
   etching said surface of the substrate in molten sodium carbonate,
   burning out residual carbon from said etched surface,
   dissolving silica on said etched surface in 10% HF,
   placing the substrate in a furnace,
   raising a temperature inside said furnace to uniformly heat said substrate prior to applying said coating,
   monitoring the temperature inside said furnace to determine when said substrate is heated to a first temperature greater than about 1000° C.,
   plasma spraying mullite powder having a crystallization temperature of about 1000° C. onto said etched surface of said substrate while maintaining said substrate at said first temperature whereby said mullite crystallizes as it solidifies at a rate that facilitates the formation of a crystalline mullite coating that is resistant to cracking and delamination, and,
   cooling the coated substrate to a second temperature that is ambient.

2. A coating method as claimed in claim 1 wherein the substrate is silicon carbide.

3. A coating method as claimed in claim 1 wherein the molten sodium carbonate is maintained at a temperature between about 860° C. and about 1000° C. during etching.

4. A coating method as claimed in claim 3 wherein the substrate is submerged in molten sodium carbonate for about 8 hours to about 10 hours.

5. A coating method as claimed in claim 1 wherein the etched substrate is oxidized at about 1000° C. in air to burn out residual carbon.

6. A coating method as claimed in claim 5 wherein the etched substrate is oxidized for about 28 minutes to about 30 minutes to burn out residual carbon.

7. A coating method as claimed in claim 6 wherein the etched surface is immersed in 10% HF for about 24 hours to dissolve silicon dioxide.

* * * * *